(12) United States Patent
Ma et al.

(10) Patent No.: US 9,883,504 B2
(45) Date of Patent: Jan. 30, 2018

(54) MASTER-SLAVE BASE STATION CLUSTER, CENTRAL UNIT, REMOTE UNIT, AND INFORMATION PROCESSING METHOD

(71) Applicant: Huawei Technologies Co., Ltd., Shenzhen, Guangdong (CN)

(72) Inventors: Ni Ma, Shanghai (CN); Xinyan Lv, Shenzhen (CN); Qinghai Zeng, Shanghai (CN); Jueping Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 65 days.

(21) Appl. No.: 14/737,205

(22) Filed: Jun. 11, 2015

(65) Prior Publication Data

US 2015/0312904 A1    Oct. 29, 2015

Related U.S. Application Data

(63) Continuation of application No. PCT/CN2012/086679, filed on Dec. 14, 2012.

(51) Int. Cl.
| | |
|---|---|
| *H04W 4/00* | (2009.01) |
| *H04J 3/16* | (2006.01) |
| *H04W 72/04* | (2009.01) |
| *H04L 12/64* | (2006.01) |
| *H04W 88/08* | (2009.01) |
| *H04W 76/04* | (2009.01) |

(52) U.S. Cl.
CPC ..... *H04W 72/0433* (2013.01); *H04L 12/6418* (2013.01); *H04W 76/046* (2013.01); *H04W 88/085* (2013.01)

(58) Field of Classification Search
CPC ............ H04L 12/6418; H04W 88/085; H04W 76/046
See application file for complete search history.

(56) References Cited

U.S. PATENT DOCUMENTS 5,442,681 A * 8/1995 Kotzin ..................... H04B 7/26
                                                                      455/15
6,301,229 B1 * 10/2001 Araujo ................ H04L 12/2856
                                                                      370/252

(Continued)

FOREIGN PATENT DOCUMENTS

| CN | 101052003 A | 10/2007 |
|---|---|---|
| CN | 102647804 A | 8/2012 |
| WO | WO 2012/155612 | 11/2012 |

*Primary Examiner* — Melanie Jagannathan (57) ABSTRACT

Embodiments of the present invention provide a master-slave base station cluster, a central unit, a remote unit, and an information processing method. The master-slave base station cluster includes: a central unit and at least one remote unit, where each remote unit is connected to the central unit through a remote interface; the central unit includes: at least one of a MAC layer function module, an RLC layer function module, a PDCP layer function module, and an RRC function module, and a first interface function module; and each remote unit includes: a second interface function module, an L1 layer function module, and another function module of the MAC layer function module, the RLC layer function module, the PDCP layer function module, and the RRC function module except the function module included in the central unit.

4 Claims, 5 Drawing Sheets

(56) References Cited

U.S. PATENT DOCUMENTS

| | | | |
|---|---|---|---|
| 2004/0042452 A1* | 3/2004 | Cayla | H04L 1/188 370/389 |
| 2005/0138171 A1* | 6/2005 | Slaight | H04L 12/4641 709/225 |
| 2011/0035580 A1* | 2/2011 | Wang | H04L 63/12 713/151 |
| 2012/0020374 A1* | 1/2012 | Jonsson | H04L 49/205 370/419 |
| 2012/0165055 A1* | 6/2012 | Lee | H04W 88/085 455/507 |
| 2012/0176980 A1 | 7/2012 | Moon et al. | |
| 2014/0052864 A1* | 2/2014 | Van Der Linden | G06F 9/5077 709/226 |

* cited by examiner

MASTER-SLAVE BASE STATION CLUSTER, CENTRAL UNIT, REMOTE UNIT, AND INFORMATION PROCESSING METHOD

CROSS-REFERENCE TO RELATED APPLICATIONS

This application is a continuation of International Application No. PCT/CN2012/086679, filed on Dec. 14, 2012, which is hereby incorporated by reference in its entirety.

TECHNICAL FIELD

The present invention relates to a communications technology, and in particular, to a master-slave base station cluster, a central unit, a remote unit, and an information processing method.

BACKGROUND

With the rapid development of a mobile bandwidth, a wireless network puts an increasingly higher demand on the capacity support. In the condition that a spectrum resource is limited, a heterogeneous network (Heterogeneous network, briefly referred to as HetNet) and macro cell split are two effective capacity improvement manners.

At present, in the HetNet, there are mainly two manners of low power base stations: a remote radio head (Remote Radio Head, briefly referred to as RRH) remote manner and an integrated low power base station. The integrated low power base station, for example, may be a micro base station (Micro), a pico base station (Pico), or a home base station (Femto). The former manner puts a high demand on a transmission bandwidth and time delay, and a bare fiber or wave division multiplexing (Wave Division Multiplexing, briefly referred to as WDM) manner is required for transmission; and the later manner cannot implement maximization of resource sharing. At present, a solution that can reduce the transmission bandwidth and the time delay and maximize resource sharing is required.

SUMMARY

Embodiments of the present invention provide a mother-son base station cluster, a central unit, a remote unit, and an information processing method, which are used to reduce the requirements on a transmission bandwidth and time delay, and maximize resource sharing.

According to a first aspect, a master-slave base station cluster is provided, which includes: a central unit and at least one remote unit, where each remote unit is connected to the central unit through a remote interface;

the central unit includes: at least one function module of a media access control MAC layer function module, a radio link control RLC layer function module, a packet data convergence protocol PDCP layer function module, and a radio resource control RRC function module, and a first interface function module; the at least one function module of the MAC layer function module, the RLC layer function module, the PDCP layer function module, and the RRC function module included in the central unit is configured to use a protocol of a layer to which each function module belongs to perform corresponding processing on data; and the first interface function module is configured to generate an IP packet or a layer 2 packet according to the data processed by the at least one function module of the MAC layer function module, the RLC layer function module, the PDCP layer function module, and the RRC function module, and transfer the packet to each remote unit; and each remote unit includes: a second interface function module, a layer 1 (L1) layer function module, and another function module of the MAC layer function module, the RLC layer function module, the PDCP layer function module, and the RRC function module except the function module included in the central unit; the second interface function module is connected to the first interface function module, and is configured to parse the IP packet or the layer 2 packet transferred by the first interface function module; and the L1 layer function module, and the another function module of the MAC layer function module, the RLC layer function module, the PDCP layer function module, and the RRC function module except the function module included in the central unit, are configured to use a protocol of a layer to which each function module belongs to perform corresponding processing on the data obtained through parsing by the second interface function module.

In a first possible implementation manner of the first aspect, the central unit includes the MAC layer function module, the RLC layer function module, the PDCP layer function module, the RRC function module, and the first interface function module; and each remote unit includes the second interface function module and the L1 layer function module; where the second interface function module of each remote unit is connected to the first interface function module through an L1 remote interface.

In a second possible implementation manner of the first aspect, the central unit includes the RLC layer function module, the PDCP layer function module, the RRC function module, and the first interface function module; and each remote unit includes the MAC layer function module, the second interface function module, and the L1 layer function module, where the second interface function module of each remote unit is connected to the first interface function module through a MAC remote interface.

In a third possible implementation manner of the first aspect, the MAC layer function module includes: a MAC layer control sub-module and a MAC layer data sub-module; and the central unit includes the MAC layer control sub-module, the RLC layer function module, the PDCP layer function module, the RRC function module and the first interface function module; and each remote unit includes the MAC layer data sub-module, the second interface function module, and the L1 layer function module, where the second interface function module of each remote unit is connected to the first interface function module through a MAC remote interface.

In a fourth possible implementation manner of the first aspect, the central unit includes the PDCP layer function module, the RRC function module, and the first interface function module; and each remote unit includes the MAC layer function module, the PLC layer function module, the second interface function module, and the L1 layer function module, where the second interface function module of each remote unit is connected to the first interface function module through an RLC remote interface.

In a fifth possible implementation manner of the first aspect, the central unit includes the RRC function module and the first interface function module; and each remote unit includes the MAC layer function module, the RLC layer function module, the PDCP layer function module, the second interface function module, and the L1 layer function module, where the second interface function module of each remote unit is connected to the first interface function module through a PDCP remote interface.

With reference to the first aspect or the first possible implementation manner of the first aspect or the second possible implementation manner of the first aspect or the third possible implementation manner of the first aspect or the fourth possible implementation manner of the first aspect or the fifth possible implementation manner of the first aspect, in a sixth possible implementation manner of the first aspect, the central unit further includes: a coordination module, configured to coordinate communication between the at least one remote unit and the central unit, and when the at least one remote unit includes at least two remote units, perform coordination and control on radio signal interference between the at least two remote units.

According to a second aspect, a central unit is provided, where the central unit and at least one remote unit form a master-slave base station cluster, and the central unit includes: at least one function module of a media access control MAC layer function module, a radio link control RLC layer function module, a packet data convergence protocol PDCP layer function module, and a radio resource control RRC function module, and a first interface function module; the at least one function module of the MAC layer function module, the RLC layer function module, the PDCP layer function module, and the RRC function module included in the central unit is configured to use a protocol of a layer to which each function module belongs to perform corresponding processing on data; and the first interface function module is connected to each remote unit through a remote interface, and is configured to generate an IP packet or a layer 2 packet according to the data processed by the at least one function module of the MAC layer function module, the RLC layer function module, the PDCP layer function module, and the RRC function module to transfer the packet to each remote unit, where each remote unit includes: a second interface function module, an L1 layer function module, and another function module of the MAC layer function module, the RLC layer function module, the PDCP layer function module, and the RRC function module except the function module included in the central unit.

In a first possible implementation manner of the second aspect, the central unit includes the MAC layer function module, the RLC layer function module, the PDCP layer function module, the RRC function module, and the first interface function module; and the first interface function module of the central unit is connected to the second interface function module of each remote unit through an L1 remote interface.

In a second possible implementation manner of the second aspect the central unit includes the RLC layer function module, the PDCP layer function module, the RRC function module, and the first interface function module; and the first interface function module of the central unit is connected to the second interface function module of each remote unit through a MAC remote interface.

In a third possible implementation manner of the second aspect, the MAC layer function module includes: a MAC layer control sub-module and a MAC layer data sub-module; and the central unit includes the MAC layer control sub-module, the RLC layer function module, the PDCP layer function module, the RRC function module, and the first interface function module; and the first interface function module of the central unit is connected to the second interface function module of each remote unit through a MAC remote interface.

In a fourth possible implementation manner of the second aspect, the central unit includes the PDCP layer function module, the RRC function module, and the first interface function module; and the first interface function module of the central unit is connected to the second interface function module of each remote unit through an RLC remote interface.

In fifth possible implementation manner of the second aspect, the central unit includes the RRC function module and the first interface function module; and the first interface function module of the central unit is connected to the second interface function module of each remote unit through a PDCP remote interface.

With reference to the second aspect or the first possible implementation manner of the second aspect or the second possible implementation manner of the second aspect or the third possible implementation manner of the second aspect or the fourth possible implementation manner of the second aspect or the fifth possible implementation manner of the second aspect, in a sixth possible implementation manner of the second aspect, the central unit further includes: a coordination module, configured to coordinate communication between the at least one remote unit and the central unit, and when the at least one remote unit includes at least two remote units, perform coordination and control on radio signal interference between the at least two remote units.

According to a third aspect, a remote unit is provided, where the remote unit and a central unit form a master-slave base station cluster, and the remote unit includes: a second interface function module, an L1 layer function module, and another function module of a media access control MAC layer function module, a radio link control RLC layer function module, a packet data convergence protocol PDCP layer function module, and a radio resource control RRC function module except a function module included in the central unit; the second interface function module is connected to the central unit through a remote interface, and is configured to parse an IP packet or a layer 2 packet transferred by the central unit; and the L1 layer function module, and the another function module in the MAC layer function module, the RLC layer function module, the PDCP layer function module, and the RRC function module except the function module included in the central unit, are configured to use a protocol of a layer to which each function module belongs to perform corresponding processing on the data obtained through parsing by the second interface function module; and the central unit includes: the first interface function module, and at least one function module of the MAC layer function module, the RLC layer function module, the PDCP layer function module, and the RRC function module.

In a first possible implementation manner of the third aspect, the remote unit only includes the second interface function module and the L1 layer function module; and the second interface function module of the remote unit is connected to the first interface function module through an L1 remote interface.

In a second possible implementation manner of the third aspect, the remote unit includes the MAC layer function module, the second interface function module, and the L1 layer function module; and the second interface function module of the remote unit is connected to the first interface function module through a MAC remote interface.

In a third possible implementation manner of the third aspect, the MAC layer function module includes: a MAC layer control sub-module and a MAC layer data sub-module; and the remote unit includes the MAC layer data sub-module, the second interface function module, and the L1 layer function module; and the second interface function module of the remote unit is connected to the first interface function module through a MAC remote interface.

In a fourth possible implementation manner of the third aspect, the remote unit includes the MAC layer function module, the RLC layer function module, the second interface function module, and the L1 layer function module; and the second interface function module of the remote unit is connected to the first interface function module through an RLC remote interface.

In a fifth possible implementation manner of the third aspect, the remote unit includes the MAC layer function module, the RLC layer function module, the PDCP layer function module, the second interface function module, and the L1 layer function module; and the second interface function module of the remote unit is connected to the first interface function module through a PDCP remote interface.

According to a fourth aspect, an information processing method is provided, which includes:

using, by a central unit in a master-slave base station cluster, a protocol of at least one layer of a media access control MAC layer, a radio link control RLC layer, a packet data convergence protocol PDCP layer, and a radio resource control RRC layer to perform corresponding processing on data, generating an IP packet or a layer 2 packet according to the processed data, and transferring the IP packet or the layer 2 packet to each remote unit in the master-slave base station cluster; and parsing, by the remote unit in the master-slave base station cluster, the IP packet or the layer 2 packet, using a layer 1 (L1) layer, and a layer of the MAC layer, the RLC layer, the PDCP layer, and the RRC layer except the central unit to process the data, and using a protocol of another layer except a protocol of each layer to perform corresponding processing on the data obtained through parsing.

According to a fifth aspect, an information processing method is provided, which includes:

using, by a central unit in a master-slave base station cluster, a protocol of at least one layer of a media access control MAC layer, a radio link control RLC layer, a packet data convergence protocol PDCP layer, and a radio resource control RRC layer to perform corresponding processing on data, where the central unit and at least one remote unit form the master-slave base station cluster; and generating, by the central unit, an IP packet or a layer 2 packet according to the processed data, and transferring the IP packet or the layer 2 packet to each remote unit in the master-slave base station cluster, so that the remote unit parses the IP packet or the layer 2 packet, uses a layer 1 (L1) layer, and a layer of the MAC layer, the RLC layer, the PDCP layer, and the RRC layer except the central unit to process the data, and uses a protocol of another layer except a protocol of each layer to perform corresponding processing on the data obtained through parsing.

According to a sixth aspect, an information processing method is provided, which includes:

receiving, by a remote unit in a master-slave base station cluster, an IP packet or a layer 2 packet sent by a central unit in the master-slave base station cluster, where the IP packet or the layer 2 packet is generated according to data processed by the central unit by using a protocol of at least one layer of a media access control MAC layer, a radio link control RLC layer, a packet data convergence protocol PDCP layer, and a radio resource control RRC layer to perform corresponding processing on the data, and the central unit and the at least one remote unit form the master-slave base station cluster; and parsing, by the remote unit, the IP packet or the layer 2 packet, using a layer 1 (L1) layer, and a layer of the MAC layer, the RLC layer, the PDCP layer, and the RRC layer except the central unit to process the data, and using a protocol of another layer except a protocol of each layer to perform corresponding processing on the data obtained through parsing.

According to the master-slave base station cluster, the central unit, the remote unit, and the information processing method provided in the embodiments of the present invention, the central unit and the remote unit form the master-slave base station cluster, the central unit is connected to the remote unit based on the remote interface, and the central unit and the remote unit may perform communication based on the remote interface, thereby facilitating implementing resource sharing. By implementing an L1 layer function at the remote unit, and jointly implementing a media access control layer function, a radio link control layer function, a packet data convergence protocol layer function, and a radio resource control function through the central unit and the remote unit, the remote interface between the central unit and the remote unit is at least one of the L1 remote interface, the MAC remote interface, the RLC remote interface, and the PDCP remote interface. Compared with a remote interface in an existing RRH remote manner, the data volume transmitted by these interfaces: the L1 remote interface, the MAC remote interface, the RLC remote interface, and the PDCP remote interface is relatively smaller, thereby facilitating reducing the data volume exchanged between the central unit and the remote unit, and reducing the requirements on the transmission bandwidth and the time delay.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DETAILED DESCRIPTION

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
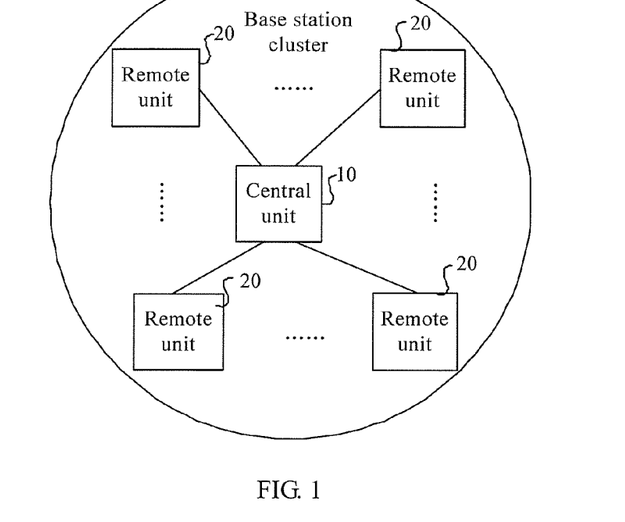
FIG. 1 is a schematic structural diagram of a master-slave base station cluster according to an embodiment of the present invention.

FIG. 1 is a schematic structural diagram of a master-slave base station cluster according to an embodiment of the present invention. As shown in FIG. 1, the master-slave base station cluster in this embodiment includes: a central unit (Central Unit) 10 and at least one remote unit (Remote Unit) 20. Each remote unit 20 is connected to the central unit 10 through a remote interface. The master-slave base station cluster provided in the embodiment of the present invention may be a cluster centering the central unit 10, and formed by at least one remote unit 20 mutually connected to the central unit 10.

The central unit 10 in this embodiment includes: at least one function module of a media access control (Media Access Control, briefly referred to as MAC) layer function module, a radio link control (Radio Link Control, briefly referred to as RLC) layer function module, a packet data convergence protocol (Packet Data Convergence Protocol, briefly referred to as PDCP) layer function module, and a radio resource control (Radio Resource Control, briefly referred to as RRC) function module, and a first interface function module. The MAC layer function module, the RLC layer function module, the PDCP layer function module, or the RRC function module may be understood as a module implementing a function of each protocol layer. The at least one function module of the MAC layer function module, the RLC layer function module, the PDCP layer function module, and the RRC function module included in the central unit 10 may be configured to use a protocol of a layer to which each function module belongs to perform corresponding processing on data. For example, a layer to which the MAC layer function module belongs is a MAC layer, a layer to which the RLC layer function module belongs is an RLC layer, a layer to which the PDCP layer function module belongs is a PDCP layer, and so on. The first interface function module is configured to generate an IP packet or a layer 2 packet according to the data processed by the at least one of the MAC layer function module, the RLC layer function module, the PDCP layer function module, and the RRC function module, and transfer the packet to each remote unit 20.

Each remote unit 20 in this embodiment includes: a second interface function module, a layer 1 (L1) layer function module, and another function module of the MAC layer function module, the RLC layer function module, the PDCP layer function module, and the RRC function module except the function module included in the central unit 10; the second interface function module is configured to parse the IP packet or the layer 2 packet transferred by the first interface function module; and the L1 layer function module, and the another function module of the MAC layer function module, the RLC layer function module, the PDCP layer function module, and the RRC function module except the function module included in the central unit 10, are configured to use a protocol of a layer to which each function module belongs to perform corresponding processing on the data obtained through parsing by the second interface function module.

It should be noted that, the data involved in the embodiments of the present invention is a broad concept, and may include user data and/or control signaling transmitted between a user and a core network, and derived data after related protocol processing.

It can be seen from the above that, the master-slave base station cluster in this embodiment implement, by separating the central unit 10 and the remote unit 20, and by adding an interface function module at the central unit 10 and the remote unit 20, communication between the central unit 10 and the remote unit 20, thereby facilitating implementing resource sharing.

In addition, the master-slave base station cluster in this embodiment jointly implement a MAC layer function, an RLC layer function, a PDCP layer function, and an RRC function at the central unit 10 and the remote unit 20, and therefore, the remote interface between the central unit 10 and the remote unit 20 is at least one of an L1 remote interface, a MAC remote interface, an RLC remote interface, and a PDCP remote interface. The L1 remote interface refers to an interface between the remote unit 20 and the central unit 10 when the L1 layer function module is located on the remote unit 20 and the remote unit 20 is connected to the central unit 10 through the L1 layer function module. The MAC remote interface refers to an interface between the remote unit 20 and the central unit 10 when the MAC layer function module is located on the remote unit 20 and the remote unit 20 is connected to the central unit 10 through the MAC layer function module. The RLC remote interface refers to an interface between the remote unit 20 and the central unit 10 when the RLC layer function module is located on the remote unit 20 and the remote unit 20 is connected to the central unit 10 through the RLC layer function module. The PDCP remote interface refers to an interface between the remote unit 20 and the central unit 10 when the PDCP layer function module is located on the remote unit 20 and the remote unit 20 is connected to the central unit 10 through a PDCP layer function module. Compared with a remote interface in an existing RRH remote manner, the data volume transmitted by these interfaces: the L1 remote interface, the MAC remote interface, the RLC remote interface, and the PDCP remote interface is relatively smaller, thereby facilitating reducing the data volume exchanged between the central unit 10 and the remote unit 20, and reducing the requirements on a transmission bandwidth and time delay. It can be seen that, the master-slave base station cluster in this embodiment provides a solution which can reduce the requirements on the transmission bandwidth and the time delay, and implement maximization of resource sharing.

Figure 2:
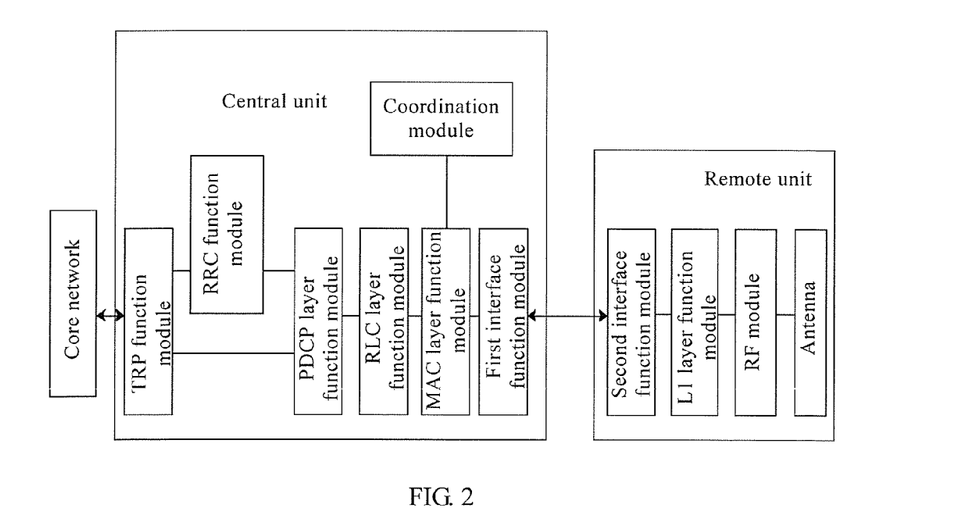
FIG. 2 is a schematic structural diagram of a central unit and a remote unit in a master-slave base station cluster according to an embodiment of the present invention.

In an optional implementation manner, as shown in FIG. 2, the central unit 10 in this embodiment includes: the first interface function module, the MAC layer function module, the RLC layer function module, the PDCP layer function module, and the RRC function module; and each remote unit 20 includes: the second interface function module and the L1 layer function module. Besides, the central unit 10 further includes: a total radiated power (Total Radiated Power, briefly referred to as TRP) function module, which is mainly configured to process IP transmission on an S1 interface and an X2 interface. The S1 interface refers to a communication interface between the central unit 10 and a core network in this embodiment, and specifically refers to a communication interface between a TRP function module in the central unit 10 and the core network. The X2 interface refers to a communication interface between different central units 10. The second interface function module of each remote unit 20 is connected to the first interface function module of the central unit 10 through a remote L1 layer interface.

In this implementation manner, the central unit 10 uses a protocol of a layer to which each function module belongs to perform corresponding processing on data through the MAC layer function module, the RLC layer function module, the PDCP layer function module, and the RRC function module thereof in order. For a manner for each function module to use the protocol of the layer to which it belongs to perform corresponding processing on the data, reference may be made to relevant description in the prior art. The L1 layer function module in the remote unit 20 performs L1 layer processing on the data. For example, for data sent from the central unit 10 to the remote unit 20, the PDCP layer function module in the central unit 10 performs processing such as transmission control protocol (Transmission Control Protocol, briefly referred to as TCP)/user datagram protocol (User Datagram Protocol, briefly referred to as UDP)/internet protocol (Internet Protocol, briefly referred to as IP) header compression on the data, so as to send the data to the RLC layer function module. The RLC layer function module of the central unit 10 performs fragmentation and cascading on a data packet and then sends the packet to the MAC layer function module. The MAC layer function module of the central unit 10 selects a proper modulation and coding scheme (Modulation and Coding Scheme, briefly referred to as MCS), and then the first interface function module encapsulates the data processed by the foregoing function module into an IP packet or a layer 2 packet, and sends the packet to the second interface function module of the remote unit 20 through the L1 remote interface. The second interface function module of the remote unit 20 parses the IP packet or the layer 2 packet, and provides the data obtained through parsing to the L1 layer function module of the remote unit 20. The L1 layer function module of the remote unit 20 performs coding and modulation according to the MCS selected by the MAC layer function module, and finally, a radio frequency module and an antenna in the remote unit 20 performs processing for sending. The antenna here is an optional component. Control signaling of a layer 3 is mainly sent to the PDCP layer function module by the RRC function module.

For a processing procedure of data sent from the remote unit 20 to the central unit 10, reference may be made to the processing procedure of the data sent from the central unit 10 to the remote unit 20 for implementation, and the difference lies in that: a processing direction is opposite, and data content is different, which are not described herein again.

Figure 3:
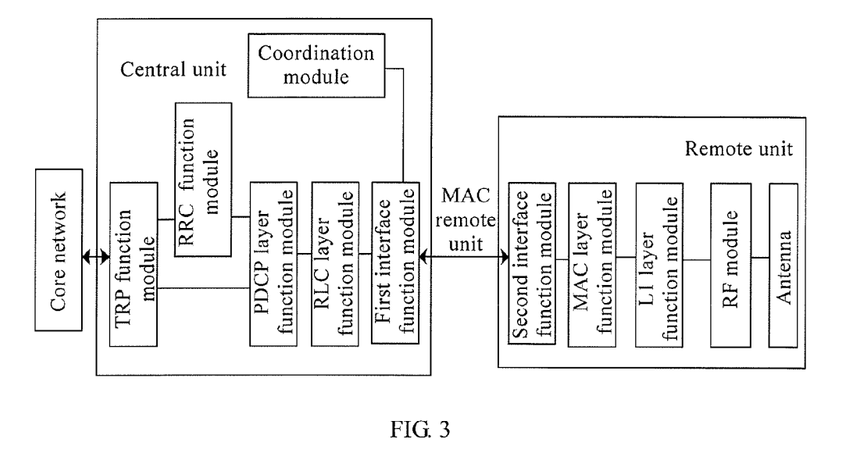
FIG. 3 is a schematic structural diagram of a central unit and a remote unit in a master-slave base station cluster according to another embodiment of the present invention.

In another optional implementation manner, as shown in FIG. 3, the central unit 10 in this embodiment includes: the first interface function module, the RLC layer function module, the PDCP layer function module, and the RRC function module. Each remote unit 20 includes: the second interface function module, the L1 layer function module, and the MAC layer function module. The second interface function module of each remote unit 20 is connected to the first interface function module of the central unit 10 through a remote MAC layer interface.

In this implementation manner, the central unit 10 uses a protocol of a layer to which each function module belongs to perform corresponding processing on data through the RLC layer function module, the PDCP layer function module, and the RRC function module thereof in order. For a manner for each function module to use the protocol of the layer to which it belongs to perform corresponding processing on the data, reference may be made to relevant description in the prior art. The MAC layer function module and the L1 layer function module in the remote unit 20 performs MAC layer and L1 layer processing on the data. For example, for data sent from the central unit 10 to the remote unit 20, the PDCP layer function module of the central unit 10 performs processing such as TCP/UDP/IP header compression on the data in order and then sends the data to the RLC layer function module. The RLC layer function module of the central unit 10 performs fragmentation' and cascading on a data packet, and then sends related data to the first interface function module; and the first interface function module encapsulates the data into an IP packet or a layer 2 packet, and sends the packet to the second interface function module of the remote unit 20 through the MAC remote interface. The second interface function module of the remote unit 20 parses the IP packet or the layer 2 packet, and sends the data obtained through parsing to the MAC layer function module of the remote unit 20; and the MAC layer function module of the remote unit 20 selects a proper MCS, and then sends the processed data to the L1 layer function module of the remote unit 20. The L1 layer function module of the remote unit 20 performs coding and modulation according to the MCS selected by the MAC layer function module, and finally, a radio frequency module and an antenna in the remote unit 20 performs processing for sending. The antenna here is an optional component. Control signaling of a layer 3 is mainly sent to the PDCP layer function module by the RRC function module.

For a processing procedure of data sent from the remote unit 20 to the central unit 10, reference may be made to the processing procedure of the data sent from the central unit 10 to the remote unit 20 for implementation, and the difference lies in that: a processing direction is opposite, and data content is different, which are not described herein again.

Figure 4:
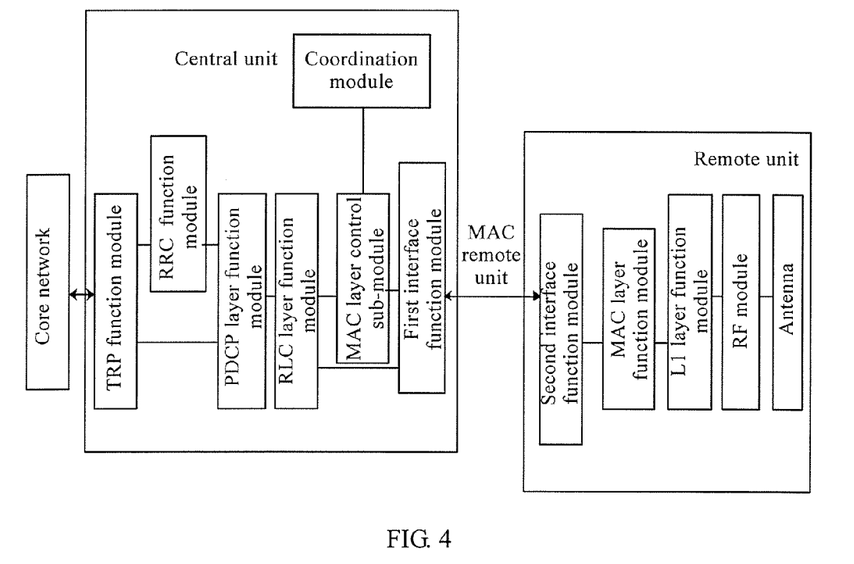
FIG. 4 is a schematic structural diagram of a central unit and a remote unit in a master-slave base station cluster according to still another embodiment of the present invention.

In still another optional implementation manner, the MAC layer function module includes: a MAC layer control sub-module and a MAC layer data sub-module. The MAC layer control sub-module is mainly responsible for completing a control plane function of the MAC layer, for example, mainly using a protocol of a layer to which the MAC layer control sub-module belongs to perform corresponding processing on control signaling of the layer to which the MAC layer control sub-module belongs. The MAC layer data sub-module is mainly responsible for completing a user plane function of the MAC layer, for example, mainly using a protocol of a layer to which the MAC layer data sub-module belongs to perform corresponding processing on user plane data of the layer to which the MAC layer data sub-module belongs. As shown in FIG. 4, the central unit 10 in this embodiment includes: the first interface function module, the MAC layer control sub-module, the RLC layer function module, the PDCP layer function module, and the RRC function module. Each remote unit 20 includes: the second interface function module, the L1 layer function module, and the MAC layer data sub-module. The second interface function module of each remote unit 20 is connected to the first interface function module of the central unit 10 through a remote MAC layer interface.

In this implementation manner, the central unit 10 uses a protocol of a layer to which each function module belongs to perform corresponding processing on data through the MAC layer control sub-module, the RLC layer function module, the PDCP layer function module, and the RRC function module thereof in order. For a manner for each function module to use the protocol of the layer to which it belongs to perform corresponding processing on the data, reference may be made to relevant description in the prior art. The MAC layer data sub-module and the L1 layer function module in the remote unit 20 perform MAC layer and L1 layer processing on the data. For example, for data sent from the central unit 10 to the remote unit 20, where the data mainly refers to user plane data, the PDCP layer function module of the central unit 10 performs processing such as TCP/UDP/IP header compression on the data in order and then sends the data to the RLC layer function module. The RLC layer function module of the central unit 10 performs fragmentation and cascading on a data packet, and then sends related data to the first interface function module of the central unit 10; and the first interface function module encapsulates the data into an IP packet or a layer 2 packet, and sends the packet to the second interface function module of the remote unit 20 through the MAC remote interface. The second interface function module of the remote unit 20 parses the IP packet or the layer 2 packet, and sends the data obtained through parsing to the MAC layer data sub-module of the remote unit 20; and the MAC layer data sub-module of the remote unit 20 selects a proper MCS, and then sends the processed data to the L1 layer function module of the remote unit 20. The L1 layer function module of the remote unit 20 performs coding and modulation according to the MCS selected by the MAC layer data sub-module, and finally, a radio frequency module and an antenna in the remote unit 20 performs processing for sending. The antenna here is an optional component. Control signaling of the MAC layer is mainly sent by the RRC function module to the PDCP layer function module, and the MAC layer control plane function is completed by the MAC layer control sub-module.

For a processing procedure of data sent from the remote unit 20 to the central unit 10, reference may be made to the processing procedure of the data sent from the central unit 10 to the remote unit 20 for implementation, and the difference lies in that: a processing direction is opposite, and data content is different, which are not described herein again.

Figure 5:
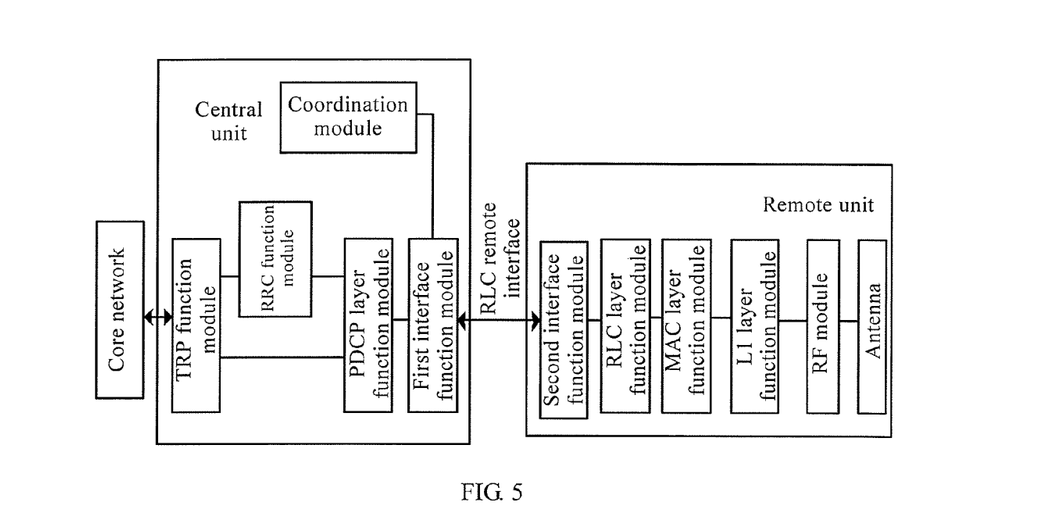
FIG. 5 is a schematic structural diagram of a central unit and a remote unit in a master-slave base station cluster according to still another embodiment of the present invention.

In still another optional implementation manner, as shown in FIG. 5, the central unit 10 in this embodiment includes: the first interface function module, the PDCP layer function module, and the RRC function module. Each remote unit 20 includes: the second interface function module, the L1 layer function module, the MAC layer function module, and the RLC layer function module. The second interface function module of each remote unit 20 is connected to the first interface function module of the central unit 10 through a remote RLC layer interface.

In this implementation manner, the central unit 10 uses a protocol of a layer to which each function module belongs to perform corresponding processing on data through the PDCP layer function module and the RRC function module thereof in order. For a manner for each function module to use a protocol of the layer to which it belongs to perform corresponding processing on the data, reference may be made to relevant description in the prior art. The RLC layer function module, the MAC layer function module, and the L1 layer function module in the remote unit 20 uses a protocol of a layer to which each function module belongs to perform corresponding processing on the data. For a manner for each function module to use the protocol of the layer to which it belongs to perform corresponding processing on the data, reference may be made to relevant description in the prior art. For example, for data sent from the central unit 10 to the remote unit 20, the PDCP layer function module of the central unit 10 performs processing such as TCP/UDP/IP header compression on the data in order and then sends the data to the first interface function module of the central unit 10. The first interface function module encapsulates the data into an IP packet or a layer 2 packet, and sends the packet to the second interface function module of the remote unit 20 through the RLC remote interface. The second interface function module parses the IP packet or the layer 2 packet, and sends the data obtained through parsing to the RLC layer function module of the remote unit 20; and the RLC layer function module of the remote unit 20 performs fragmentation and cascading on a data packet and then sends the packet to the MAC layer function module of the remote unit 20. The MAC layer function module of the remote unit 20 selects a proper MCS, and then sends the processed data to the L1 layer function module of the remote unit 20. The L1 layer function module of the remote unit 20 performs coding and modulation according to the MCS selected by the MAC layer function module, and finally, a radio frequency module and an antenna in the remote unit 20 performs processing for sending. The antenna here is an optional component. Control signaling of a layer 3 is mainly sent to the PDCP layer function module by the RRC function module.

For a processing procedure of data sent from the remote unit 20 to the central unit 10, reference may be made to the processing procedure of the data sent from the central unit 10 to the remote unit 20 for implementation, and the difference lies in that: a processing direction is opposite, and data content is different, which are not described herein again.

Figure 6:
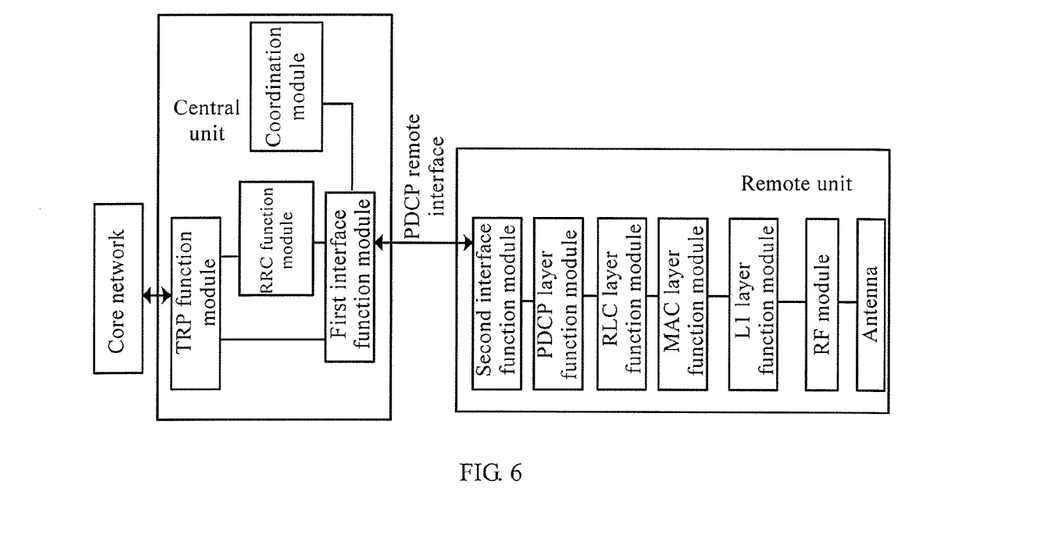
FIG. 6 is a schematic structural diagram of a central unit and a remote unit in a master-slave base station cluster according to still another embodiment of the present invention.

In still another optional implementation manner, as shown in FIG. 6, the central unit 10 in this embodiment includes: the first interface function module and the RRC function module. Each remote unit 20 includes: the second interface function module, the L1 layer function module, the MAC layer function module, the RLC layer function module, and the PDCP layer function module. The second interface function module of each remote unit 20 is connected to the first interface function module of the central unit 10 through a remote PDCP layer interface.

In this implementation manner, the remote unit 20 uses a protocol of a layer to which each function module belongs to perform corresponding processing on data through the PDCP layer function module, the MAC layer function module, the RLC layer function module, and the L1 layer function module thereof in order. For a manner for each function module to use the protocol of the layer to which it belongs to perform corresponding processing on the data, reference may be made to relevant description in the prior art. The RRC function module in the central unit 10 uses a protocol of a layer to which it belongs to perform corresponding processing on the data. For a manner for the RRC function module to use the protocol of the layer to which it belongs to perform corresponding processing on the data, reference may be made to relevant description in the prior art. For example, for data sent from the central unit 10 to the remote unit 20, the PDCP layer function module of the remote unit 20 performs processing such as TCP/UDP/IP header compression on the data in order and then sends the data to the first interface function module of the central unit 10. The first interface function module encapsulates the data into an IP packet or a layer 2 packet, and sends the packet to the second interface function module of the remote unit 20 through the PDCP remote interface. The second interface function module parses the IP packet or the layer 2 packet, and sends the data obtained through parsing to the RLC layer function module of the remote unit 20. The RLC layer function module of the remote unit 20 performs fragmentation and cascading on the data packet and then sends the packet to the MAC layer function module of the remote unit 20. The MAC layer function module of the remote unit 20 selects a proper MCS, and sends the processed data to the L1 layer function module of the remote unit 20. The L1 layer function module of the remote unit 20 performs coding and modulation according to the MCS selected by the MAC layer function module, and finally, a radio frequency module and an antenna in the remote unit 20 performs processing for sending. The antenna here is an optional component. Control signaling of a layer 3 is mainly sent to the PDCP layer function module by the RRC function module through a PDCP remote interface.

For a processing procedure of data sent from the remote unit 20 to the central unit 10, reference may be made to the processing procedure of the data sent from the central unit 10 to the remote unit 20 for implementation, and the difference lies in that: a processing direction is opposite, and data content is different, which are not described herein again.

In an optional implementation manner, as shown in FIG. 2 to FIG. 6, the central unit 10 in this embodiment may further include a coordination module. The coordination module is mainly configured to coordinate communication between the central unit 10 and the at least one remote unit 20 connected to the central unit 10, and when the at least one remote unit 20 includes at least two remote units 20, is responsible for performing coordination and control on radio signal interference between the at least two remote units 20. According to an application need, the coordination module of the central unit 10 may be connected to another module in the central unit 10. For example, the coordination module may be connected to all the other modules in the central unit 10, and may also be connected to a part of the other modules in the central unit 10. FIG. 2 and FIG. 4 are shown with an example where a coordination module is only connected to a MAC layer function module; and FIG. 3, FIG. 5, and FIG. 6 are shown with an example where a coordination module is only connected to a first interface function module. For another example, when the central unit 10 includes the MAC layer function module and the first interface function module at the same time, the coordination module may further be connected to the MAC layer function module and the first interface function module at the same time.

Further, the foregoing coordination module may further be implemented independently of the central unit 10. For example, a single device may be deployed, and is configured to complete a function of a coordination module. That is to say, the device is responsible for controlling communication between the central unit 10 and the at least one remote unit 20 connected to the central unit 10, and when the at least one remote unit 20 includes at least two remote units 20, is responsible for performing coordination and control on radio signal interference between at least two remote units 20. Correspondingly, the central unit 10 may not include the coordination module.

In the foregoing implementation manners, the central unit 10 is separated from the remote unit 20. By adding an interface function module at the central unit 10 and the remote unit 20, communication between the central unit 10 and the remote unit 20 is implemented, thereby facilitating implementing resource sharing. Further, because the coordination module is added to the central unit 10, and is responsible for coordinating communication between the central unit 10 and the remote unit 20, and radio signal interference between the remote units 20, thereby facilitating implementing sharing of information such as power and interference. In addition, the central unit 10 and the remote unit 20 jointly implement the MAC layer function, the RLC layer function, the PDCP layer function, and the RRC function. The remote interface between the central unit 10 and the remote unit 20 is the L1 remote interface, the MAC remote interface, the RLC remote interface, or the PDCP remote interface. Compared with a remote interface in an existing RRH remote manner, the data volume transmitted by these interfaces is relatively smaller, thereby facilitating reducing the data volume exchanged between the central unit 10 and the remote unit 20, and reducing the requirements on the transmission bandwidth and the time delay.

An embodiment of the present invention provides a central unit, where the central unit and at least one remote unit form a master-slave base station cluster. The central unit is connected to each remote unit through a remote interface. The central unit in this embodiment includes: at least one function module of a MAC layer function module, an RLC layer function module, a PDCP layer function module, and an RRC function module, and a first interface function module; the at least one function module of the MAC layer function module, the RLC layer function module, the PDCP layer function module, and the RRC function module included in the central unit is configured to use a protocol of a layer to which each function module belongs to perform corresponding processing on data, where for a manner for each function module to use the protocol of the layer to which it belongs to perform corresponding processing on the data, reference may be made to relevant description in the prior art; and the first interface function module is configured to generate an IP packet or a layer 2 packet according to the data processed by the at least one function module of the MAC layer function module, the RLC layer function module, the PDCP layer function module, and the RRC function module to transfer the packet to each remote unit.

Each remote unit connected to the central unit in this embodiment includes: a second interface function module, an L1 layer function module, and another function module of the MAC layer function module, the RLC layer function module, the PDCP layer function module, and the RRC function module except the function module included in the central unit in this embodiment.

The central unit in this embodiment coordinates with the remote unit to form the master-slave base station cluster. In one aspect in this embodiment, the central unit and the remote unit are separated, and the central unit and the remote unit perform communication based on remote interface, thereby facilitating implementing resource sharing. In addition, the central unit and the remote unit in this embodiment jointly implement a MAC layer function, an RLC layer function, a PDCP layer function, and an RRC function. The remote interface between the central unit and the remote unit in this embodiment is an L1 remote interface, a MAC remote interface, an RLC remote interface, or a PDCP remote interface. Compared with a remote interface in an existing RRH remote manner, the data volume of these interfaces is relatively smaller, thereby facilitating reducing the data volume exchanged between the central unit and the remote unit, and reducing the requirements on a transmission bandwidth and time delay.

In an optional implementation manner, as shown in FIG. 2, the central unit in this embodiment includes: the first interface function module, and the MAC layer function module, the RLC layer function module, the PDCP layer function module, and the RRC function module in the MAC layer function module, the RLC layer function module, the PDCP layer function module, and the RRC function module. Correspondingly, each remote unit includes: the second interface function module, and the L1 layer function module. In this embodiment, the first interface function module of the central unit is connected to the second interface function module of each remote unit through an L1 remote interface.

In an optional implementation manner, as shown in FIG. 3, the central unit in this embodiment includes: the first interface function module, and the RLC layer function module, the PDCP layer function module, and the RRC function module in the MAC layer function module, the RLC layer function module, the PDCP layer function module, and the RRC function module. Correspondingly, each remote unit includes: the second interface function module, the L1 layer function module, and the MAC layer function module in the MAC layer function module, the RLC layer function module, the PDCP layer function module, and the RRC function module. In this embodiment, the first interface function module of the central unit is connected to the second interface function module of each remote unit through a MAC remote interface.

In an optional implementation manner, the MAC layer function module includes: a MAC layer control sub-module and a MAC layer data sub-module. As shown in FIG. 4, the central unit in this embodiment includes: the first interface function module, and the MAC layer control sub-module, the RLC layer function module, the PDCP layer function module, and the RRC function module in the MAC layer function module, the RLC layer function module, the PDCP layer function module, and the RRC function module. Correspondingly, each remote unit includes: the second interface function module, the L1 layer function module, and the MAC layer data sub-module in the MAC layer function module, the RLC layer function module, the PDCP layer function module, and the RRC function module. In this embodiment, the first interface function module of the central unit is connected to the second interface function module of each remote unit through a MAC remote interface.

In an optional implementation manner, as shown in FIG. 5, the central unit in this embodiment includes: the first interface function module, and the PDCP layer function module and the RRC function module in the MAC layer function module, the RLC layer function module, the PDCP layer function module, and the RRC function module. Correspondingly, each remote unit includes: the second interface function module, the L1 layer function module, and the MAC layer function module and the RLC layer function module in the MAC layer function module, the RLC layer function module, the PDCP layer function module, and the RRC function module. In this embodiment, the first interface function module of the central unit is connected to the second interface function module of each remote unit through an RLC remote interface.

In an optional implementation manner, as shown in FIG. 6, the central unit in this embodiment includes: the first interface function module, and the RRC function module in the MAC layer function module, the RLC function module, the PDCP layer function module, and the RRC function module. Correspondingly, each remote unit includes: the second interface function module, the L1 layer function module, and the MAC layer function module, the RLC layer function module, and the PDCP layer function module in the MAC layer function module, the RLC layer function module, the PDCP layer function module, and the RRC function module. In this embodiment, the first interface function module of the central unit is connected to the second interface function module of each remote unit through a PDCP remote interface.

Optionally, the central unit in this embodiment may further include a coordination module, as shown in FIG. 2 to FIG. 6. The coordination module is configured to coordinate communication between the at least one remote unit and the central unit in this embodiment, and when the at least one remote unit includes at least two remote units, perform coordination and control on radio signal interference between the at least two remote units.

Further, as shown in FIG. 2 to FIG. 6, the central unit in this embodiment may further include a TRP function module. The TRP function module is mainly configured to process IP transmission on an S1 interface and an X2 interface.

For the working principle of each implementation structure of the central unit provided in this embodiment, reference may be made to the description of the embodiments shown in FIG. 2 to FIG. 6, which is not described herein again.

An embodiment of the present invention provides a remote unit, where at least one remote unit and a central unit may form a master-slave base station cluster. The remote unit is connected to the central unit through a remote interface. The remote unit includes: a second interface function module, an L1 layer function module, and another function module of a MAC layer function module, an RLC layer function module, a PDCP layer function module, and an RRC function module except a function module included in the central unit; the second interface function module is connected to the first interface function module through a remote interface, and is configured to parse an IP packet or a layer 2 packet transferred by the first interface function module; and the L1 layer function module, and the another function module of the MAC layer function module, the RLC layer function module, the PDCP layer function module, and the RRC function module except the function module included in the central unit, are configured to use a protocol of a layer to which each function module belongs to perform corresponding processing on the data obtained through parsing by the second interface function module. For a manner for each function module to use the protocol of the layer to which each function module belongs to perform corresponding processing on the data obtained through parsing by the second interface function module, reference may be made to relevant description in the prior art.

The central unit connected to the remote unit includes: the first interface function module, and at least one function module of the MAC layer function module, the RLC layer function module, the PDCP layer function module, and the RRC function module.

It can be seen that, the central unit in this embodiment coordinates with the remote unit to form the master-slave base station cluster. In one aspect in this embodiment, the central unit and the remote unit are separated, and the central unit and the remote unit perform communication based on remote interface, thereby facilitating implementing resource sharing. In addition, the central unit and the remote unit in this embodiment jointly implement a MAC layer function, an RLC layer function, a PDCP layer function, and an RRC function. The remote interface between the central unit and the remote unit in this embodiment is an L1 remote interface, a MAC remote interface, an RLC remote interface, or a PDCP remote interface. Compared with a remote interface in an existing RRH remote manner, the data volume of these interfaces is relatively smaller, thereby facilitating reducing the data volume exchanged between the central unit and the remote unit, and reducing the requirements on a transmission bandwidth and time delay.

In an optional implementation manner, as shown in FIG. 2, the central unit in this embodiment includes: the second interface function module and the L1 layer function module. Correspondingly, the central unit includes: the first interface function module, and the MAC layer function module, the RLC layer function module, the PDCP layer function module, and the RRC function module in the MAC layer function module, the RLC layer function module, the PDCP layer function module, and the RRC function module. In this embodiment, the second interface function module of the remote unit is connected to the first interface function module of the central unit through an L1 remote interface.

In an optional implementation manner, as shown in FIG. 3, the remote unit in this embodiment includes: the second interface function module, the L1 layer function module, and the MAC layer function module in the MAC layer function module, the RLC layer function module, the PDCP layer function module, and the RRC function module. Correspondingly, the central unit includes: the first interface function module, and the RLC layer function module, the PDCP layer function module, and the RRC function module in the MAC layer function module, the RLC layer function module, the PDCP layer function module, and the RRC function module. In this embodiment, the second interface function module of the remote unit is connected to the first interface function module of the central unit through a MAC remote interface.

In an optional implementation manner, the MAC layer function module includes: a MAC layer control sub-module and a MAC layer data sub-module. As shown in FIG. 4, the remote unit in this embodiment includes: the second interface function module, the L1 layer function module, and the MAC layer data sub-module in the MAC layer function module, the RLC layer function module, the PDCP layer function module, and the RRC function module. Correspondingly, the central unit includes: the first interface function module, and the MAC layer control sub-module, the RLC layer function module, the PDCP layer function module, and the RRC function module in the MAC layer function module, the RLC layer function module, the PDCP layer function module, and the RRC function module. In this embodiment, the second interface function module of the remote unit is connected to the first interface function module of the central unit through a MAC remote interface.

In an optional implementation manner, as shown in FIG. 5, the remote unit in this embodiment includes: the second interface function module, the L1 layer function module, and the MAC layer function module and the RLC layer function module in the MAC layer function module, the RLC layer function module, the PDCP layer function module, and the RRC function module. Correspondingly, the central unit includes: the first interface function module, and the PDCP layer function module and the RRC function module in the MAC layer function module, the RLC layer function module, the PDCP layer function module, and the RRC function module. In this embodiment, the second interface function module of the remote unit is connected to the first interface function module of the central unit through an RLC remote interface.

In an optional implementation manner, as shown in FIG. 6, the remote unit in this embodiment includes: the second interface function module, the L1 layer function module, and the MAC layer function module, the RLC layer function module, and the PDCP layer function module in the MAC layer function module, the RLC layer function module, the PDCP layer function module, and the RRC function module. Correspondingly, the central unit includes: the first interface function module, and the RRC function module in the MAC layer function module, the RLC layer function module, the PDCP layer function module, and the RRC function module. In this embodiment, the second interface function module of the remote unit is connected to the first interface function module of the central unit through a PDCP remote interface.

For the working principle of each implementation structure of the remote unit provided in this embodiment, reference may be made to the description of the embodiments shown in FIG. 2 to FIG. 6, which is not described herein again.

Figure 7:
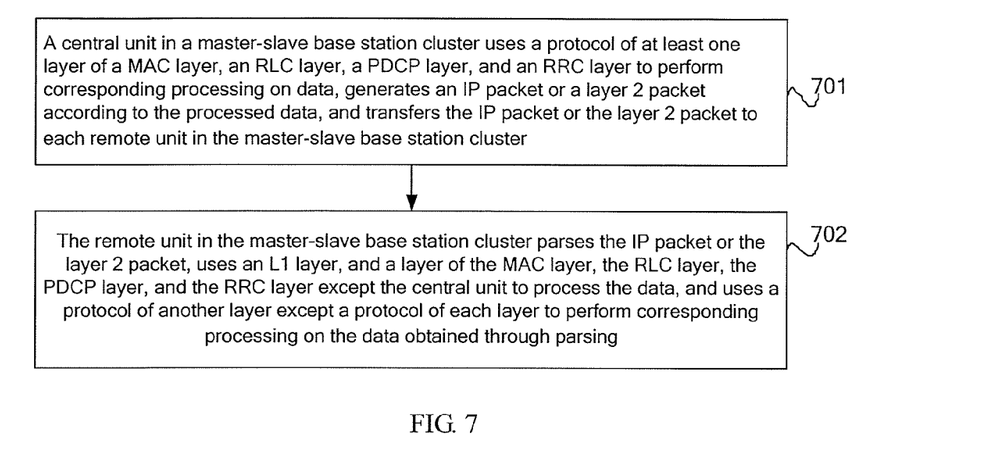
FIG. 7 is a flowchart of an information processing method according to an embodiment of the present invention.

FIG. 7 is a flowchart of an information processing method according to an embodiment of the present invention. As shown in FIG. 7, the method in this embodiment includes:

Step 701: A central unit in a master-slave base station cluster uses a protocol of at least one layer of a MAC layer, an RLC layer, a PDCP layer, and an RRC layer to perform corresponding processing on data, generates an IP packet or a layer 2 packet according to the processed data, and transfers the IP packet or the layer 2 packet to each remote unit in the master-slave base station cluster.

Step 702: The remote unit in the master-slave base station cluster parses the IP packet or the layer 2 packet, uses an L1 layer, and a layer of the MAC layer, the RLC layer, the PDCP layer, and the RRC layer except the central unit to process the data, and uses a protocol of another layer except a protocol of each layer to perform corresponding processing on the data obtained through parsing.

The information processing method provided in this embodiment may be performed by the master-slave base station cluster provided in any one of FIG. 1 to FIG. 6. For a detailed description of each step, reference may be made to the description of the embodiments shown in FIG. 1 to FIG. 6, which is not described herein again.

The information processing method provided in this embodiment is performed by the master-slave base station cluster. In one aspect, it facilitates implementing resource sharing; in another aspect, it facilitates reducing the data volume exchanged between the central unit and the remote unit, thereby reducing the requirements on a transmission bandwidth and time delay.

Figure 8:
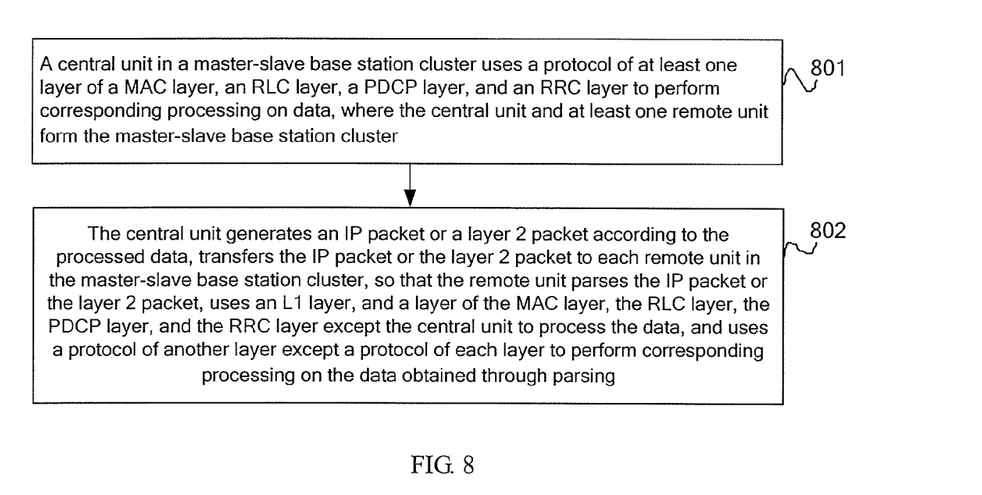
FIG. 8 is a flowchart of an information processing method according to another embodiment of the present invention.

FIG. 8 is a flowchart of an information processing method according to another embodiment of the present invention. As shown in FIG. 8, the method in this embodiment includes:

Step 801: A central unit in a master-slave base station cluster uses a protocol of at least one layer of a MAC layer, an RLC layer, a PDCP layer, and an RRC layer to perform corresponding processing on data, where the central unit and at least one remote unit form the master-slave base station cluster.

Step 802: The central unit generates an IP packet or a layer 2 packet according to the processed data, transfers the IP packet or the layer 2 packet to each remote unit in the master-slave base station cluster, so that the remote unit parses the IP packet or the layer 2 packet, uses an L1 layer, and a layer of the MAC layer, the RLC layer, the PDCP layer, and the RRC layer except the central unit to process the data, and uses a protocol of another layer except a protocol of each layer to perform corresponding processing on the data obtained through parsing.

The information processing method provided in this embodiment may be performed by the central unit in the master-slave base station cluster provided in FIG. 1 to FIG. 6. For a detailed description of each step, reference may be made to the description of the embodiments shown in FIG. 1 to FIG. 6, which is not described herein again.

Figure 9:
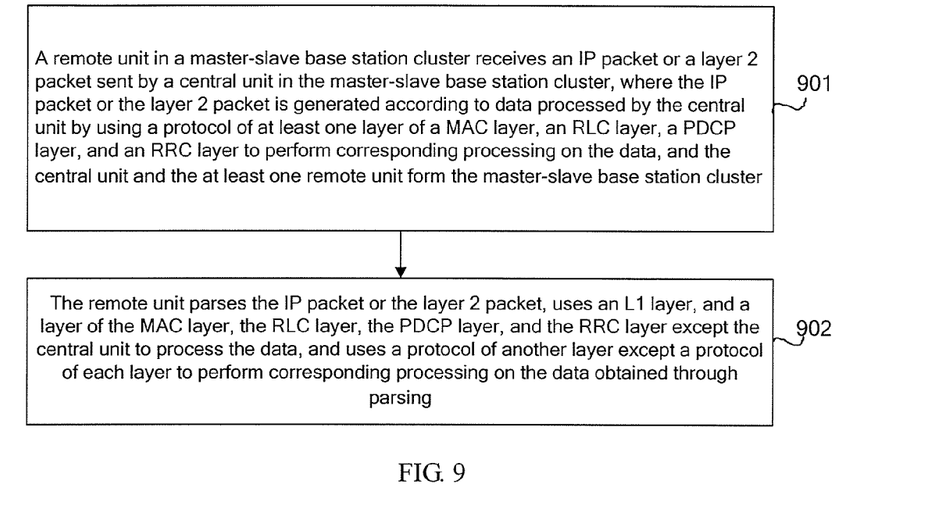
FIG. 9 is a flowchart of an information processing method according to still another embodiment of the present invention.

FIG. 9 is a flowchart of an information processing method according to still another embodiment of the present invention. As shown in FIG. 9, the method in this embodiment includes:

Step 901: A remote unit in a master-slave base station cluster receives an IP packet or a layer 2 packet sent by a central unit in the master-slave base station cluster, where the IP packet or the layer 2 packet is generated according to data processed by the central unit by using a protocol of at least one layer of a MAC layer, an RLC layer, a PDCP layer, and an RRC layer to perform corresponding processing on the data, and the central unit and the at least one remote unit form the master-slave base station cluster.

Step 902: The remote unit parses the IP packet or the layer 2 packet, uses an L1 layer, and a layer of the MAC layer, the RLC layer, the PDCP layer, and the RRC layer except the central unit to process the data, and uses a protocol of another layer except a protocol of each layer to perform corresponding processing on the data obtained through parsing.

The information processing method provided in this embodiment may be performed by the remote unit in the master-slave base station cluster provided in FIG. 1 to FIG. 6. For a detailed description of each step, reference may be made to the description of the embodiments shown in FIG. 1 to FIG. 6, which is not described herein again.

Persons of ordinary skill in the art may understand that, all or a part of the steps of the foregoing method embodiments may be implemented by a program instructing relevant hardware. The foregoing program may be stored in a computer readable storage medium. When the program runs, the steps of the foregoing method embodiments are performed. The foregoing storage mediums include various mediums capable of storing program code, such as a ROM, a RAM, a magnetic disk, or an optical disc.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments or make equivalent replacements to some or all the technical features thereof, as long as such modifications or replacement do not cause the essence of corresponding technical solutions to depart from the scope of the technical solutions of the embodiments of the present invention.

What is claimed is:

1. A master-slave base station cluster, comprising:
a central unit and at least one remote unit, wherein each remote unit is connected to the central unit through a remote interface;
wherein the central unit comprises:
a processor; and
a non-transitory computer-readable storage medium storing a program that, when executed by the processor, causes the central unit to:
perform corresponding processing on data by using a protocol of at least one layer of a media access control (MAC) layer, a radio link control (RLC) layer, a packet data convergence protocol (PDCP) layer, and a radio resource control (RRC) layer;
generate an IP packet or a Layer 2 packet according to the data processed, and transfer the IP packet or the Layer 2 packet to each remote unit; and
wherein each remote unit comprises:
a processor; and
a non-transitory computer-readable storage medium storing a program that, when executed by the processor, causes the each remote unit to:
parse the IP packet or the Layer 2 packet, and perform corresponding processing on the data by using protocols corresponding to one or more layers of the L1 layer, the MAC layer, the RLC layer, the PDCP layer, and the RRC layer, wherein the one or more layers are not in the central unit.

2. The master-slave base station cluster according to claim 1, wherein the central unit is configured to:
coordinate communication between the at least one remote unit and the central unit, and when the at least one remote unit comprises at least two remote units, perforin coordination and control on radio signal interference between the at least two remote units.

3. An information processing method, comprising:
using, by a central unit in a master-slave base station cluster, a protocol of at least one layer of a media access control (MAC) layer, a radio link control (RLC) layer, a packet data convergence protocol (PDCP) layer, and a radio resource control (RRC) layer to perform corresponding processing on data, generating an IP packet or a Layer 2 packet according to the processed data, and transferring the IP packet or the Layer 2 packet to at least one remote unit in the master-slave base station cluster;
parsing, by the at least one remote unit in the master-slave base station cluster, the IP packet or the Layer 2 packet; and
using protocol corresponding to a Layer 1 (L1) layer, and protocols corresponding to one or more layers of the MAC layer, the RLC layer, the PDCP layer, and the RRC layer to process the data obtained by parsing the IP packet or the Layer 2 packet, wherein the one or more layers are not in the central unit.

4. The information processing method according to claim 3, further comprising:
coordinating, by a central unit, communication between the at least one remote unit and the central unit; and performing coordination and control on radio signal interference between at least two remote units, when the at least one remote unit comprises the at least two remote units.

* * * * *